United States Patent

Robinson

[15] 3,670,034

[45] *June 13, 1972

[54] PROCESS FOR AROMATIC SUBSTITUTION

[72] Inventor: Robert E. Robinson, Columbia, S.C.

[73] Assignee: National Distillers and Chemical Corporation, New York, N.Y.

[ * ] Notice: The portion of the term of this patent subsequent to May 11, 1988, has been disclaimed.

[22] Filed: March 21, 1969

[21] Appl. No.: 809,379

Related U.S. Application Data

[63] Continuation-in-part of Ser. No. 631,917, April 19, 1967, abandoned, Continuation-in-part of Ser. No. 282,559, May 23, 1963, abandoned, Continuation-in-part of Ser. No. 282,594, May 23, 1963, abandoned, Continuation-in-part of Ser. No. 282,595, May 23, 1963, abandoned.

[52] U.S. Cl.................260/623 H, 260/283 R, 260/290 HL, 260/294.9, 260/329 R, 260/332.5, 260/369, 260/396 R, 260/453 AR, 260/465 G, 260/476 R, 260/505 R, 260/508, 260/515 A, 260/518 A, 260/546, 260/558 R, 260/568, 260/592, 260/599, 260/609 R, 260/612 D, 260/618 D, 260/646, 260/649 D, 260/650 R, 260/659 A, 260/670
[51] Int. Cl......................C07c 39/24, C07c 25/04
[58] Field of Search................260/650, 659, 649, 649 DP, 260/476, 670, 465 C, 453 AR, 612, 612 D, 646, 623 H

[56] References Cited

UNITED STATES PATENTS

| | | | |
|---|---|---|---|
| 1,536,706 | 5/1925 | Ernst et al. | 260/650 |
| 1,963,761 | 6/1934 | Prahl | 260/650 A |
| 2,838,577 | 6/1958 | Cook et al. | 260/659 A |
| 2,866,830 | 12/1958 | Dunn et al. | 260/659 A |
| 2,950,329 | 8/1960 | Reichfneder et al. | 260/650 |
| 3,042,705 | 7/1962 | Fierce et al. | 260/465 C |
| 3,145,237 | 8/1964 | Van Helden et al. | 260/670 |
| 3,190,912 | 6/1965 | Robinson | 260/476 X |
| 3,210,431 | 10/1965 | Engel | 260/650 X |
| 3,214,481 | 10/1965 | Heinemann et al. | 260/656 A |
| 3,214,482 | 10/1965 | Caropreso et al. | 260/656 X |
| 3,268,590 | 8/1966 | Schwenk et al. | 260/659 A |

Primary Examiner—Howard T. Mars
Attorney—Allen A. Meyer, Jr.

[57] ABSTRACT

Substituted aromatic derivatives are prepared by reacting an aromatic compound with a group VIII platinum metal salt wherein the substituent introduced is derived from the anion portion of said group VIII platinum metal salt and said salt is regenerated in situ, in the presence of a source of the anion being introduced into the aromatic compound other than said salt, by oxidation with oxygen or a multivalent transition metal ion which is in its highest valence state.

10 Claims, No Drawings

PROCESS FOR AROMATIC SUBSTITUTION

This application is a continuation-in-part of copending application No. 631,917 (filed Apr. 19, 1967), now abandoned which in turn is a continuation-in-part of copending applications Ser. No. 282,559 (filed May 23, 1963 now abandoned, Ser. No. 282,594 (filed May 23, 1963) now abandoned, and Ser. No. 282,595 (filed May 23, 1963) now abandoned.

The present invention relates to a novel reaction of aromatic compounds. More particularly, it pertains to a novel process for preparing substituted aromatic derivatives, and particularly monochlorobenzene, by the reaction of an aromatic compound with a catalytic amount of a group VIII platinum metal salt which is regenerated in situ.

Monochlorobenzene is in demand commercially in large volume as an intermediate in the synthesis of phenol, aniline, DDT [1, 1, 1-trichloro-2,2-bis(p-chlorophenyl)ethane], and other products.

One approach to synthesizing monochlorobenzene has involved the reaction of benzene with a metal halide. An article by Kharasch et al., J. Am. Chem. Soc., 53, 3,053 (1931), describes the chlorination of benzene in liquid phase at atmospheric pressure using auric chloride as the chlorinating agent. The reaction requires dry, thiophene-free benzene and anhydrous auric chloride. The presence of ether, acetic acid, alcohol, ethyl acetate, and other reagents containing oxygen prevents the reaction from taking place. Further, if the benzene is added to the auric chloride, only polysubstituted chlorobenzenes are produced. Regeneration of auric chloride from the precipitated aurous chloride formed in the reaction by treatment with chlorine gas is suggested as a means of making the reaction catalytic with respect to the gold salt. Such regeneration cannot be performed in situ if further chlorination of the benzene is to be avoided.

In a recent series of articles by Kovacic and coworkers, the direct reaction of ferric chloride with benzene and various substituted benzenes in anhydrous liquid phase reaction is explored. With alkyl and halo substituted benzenes, various isomeric mixtures are obtained. With benzene, the products comprise a small amount of chlorobenzene (no more than 6 percent yield) and a water-insoluble black solid. Chlorination fails to occur when $AlCl_3$, $SnCl_4$, and $CuCl_2$ are substituted as chlorinating agents for chlorobenzene in place of $FeCl_3$.

Accordingly, it is one object of this invention to convert benzene to monochlorobenzene by a more direct and more efficient process than is possible by prior art processes.

A further object of this invention is to provide a novel and effective process for the preparation of substituted aromatic compounds.

Another object of this invention is to provide a continuous vapor phase process for introducing substituents onto the aromatic ring of aromatic compounds.

Another object of the invention is to prepare ring substituted aromatic compounds by a continuous process wherein at least one reactant is generated in situ.

Further objects of this invention will become apparent from the following description and embodiments.

In accordance with this invention, substituted aromatic compounds are produced directly and effectively by reacting an aromatic compound with a group VIII platinum metal salt employed in a catalytic amount and continuously regenerated in situ by oxidation with oxygen or a higher valent ion of a multivalent transition metal from the first long period of the periodic system (Handbook of Chemistry and Physics, 42nd Ed., pp. 448–449, Chemical Rubber, Cleveland, 1960).

The starting aromatic compound may be an aromatic hydrocarbon, e.g., benzene, naphthalene, anthracene, phenanthrene, toluene, p-xylene, ethyl benzene, and biphenyl; a phenol, e.g., phenol, catechol, resorcinol, hydroquinone, pyrogallol, m-cresol, picric acid, and alpha-naphthol; an aromatic alcohol, e.g., benzyl alcohol, cinnamyl alcohol, and triphenylcarbinol; an aromatic amine, e.g., aniline, o-toluidine, m-phenylenediamine, anthranilic acid, and alpha-naphthylamine; an aromatic ketone, e.g., benzophenone, acetophenone, phenylacetone, and alpha-chloroacetophenone; an aromatic nitro compound, e.g., nitrobenzene, m-dinitrobenzene, alpha-nitronaphthalene, and beta-nitroanthracene; an aromatic halide, e.g., fluorobenzene, chlorobenzene, bromobenzene, iodobenzene, m-dichlorobenzene, alpha-chloronaphthalene, and p-chlorotoluene; an arylsulfonic acid, e.g., benzenesulfonic acid, p-toluenesulfonic acid, sulfanilic acid, and alpha-naphthalenesulfonic acid; an arylcarboxylic acid, e.g., benzoic acid, phenyl acetic acid, cinnamic acid, p-aminobenzoic acid, o-toluic acid, terephthalic acid, alpha-naphthoic acid, and alpha-anthroic acid; an aromatic anhydride, e.g., phthalic anhydride, benzoic anhydride, and acetic benzoic anhydride; an aromatic ether, e.g., diphenyl ether, anisole, phenetole, anisaldehyde, and guiacol; an aromatic aldehyde, e.g., benzaldehyde, salicylaldehyde, cinnamaldehyde, and piperonal; a quinone, e.g., p-quinone, alpha-naphthoquinone, and anthraquinone; an aryl mercaptan, e.g., phenyl mercaptan, aromatic amide, e.g., benzamide, phthalamide, phenylacetamide, and toluamide; an aromatic nitrile, e.g., benzonitrile, o-tolunitrile, phenylacetonitrile, and cinnamonitrile; as well as mixtures of two or more of the above compounds or types of compounds. Heterocyclic compounds, e.g., pyridine, thiophene, and quinoline, may also serve as the starting aromatic compound.

The platinum metal portion of the group VIII metal salt may be palladium, platinum, ruthenium, rhodium, osmium or iridium. The anion portion may include a halide, e.g., fluoride, bromide, chloride, or iodide; a cyanide; a carboxylate such as acetate, propionate, benzoate, etc.; a cyanate; an alkoxide, such as methoxide or ethoxide; or an aromatic oxide, such as phenoxide or naphthoxide. Examples of group VIII platinum metal salts suitable for the practice of this invention include palladous chloride, palladous bromide, platinous chloride, rhodium trichloride, palladous fluoride, palladous iodide, potassium chloropalladite, platinous bromide, platinous iodide, platinic bromide, ruthenium dichloride, ruthenium trichloride, osmium dichloride, osmium trichloride, osmium tetrachloride, iridium trichloride, iridium tetrachloride, iridium tribromide, iridium tetrabromide, palladous acetate, palladous cyanide, palladium benzoate, palladous cyanate, palladous methoxide, palladous ethoxide, palladous phenoxide, and the like.

The group VIII platinum metal component may be employed unsupported or supported on a suitable material, such as carbon, silica, alumina, or the like. The supported catalysts may be obtained commercially or may be prepared by any convenient means, such as by dissolving the metal salt or salts in a suitable solvent, e.g., water; adding the support, e.g., carbon; and evaporating the solvent with heat under vacuum. Only catalytic amounts need be employed, and specific amounts may vary from about 0.05 up to about 10 percent by weight, based on the total reaction mixture, with the preferred amount being within the range of about 0.2 to about 5 percent by weight. It has been found, for example, that using benzene as the aromatic reactant, about 0.001 to 0.1 mole of palladous chloride per mole of benzene is sufficient to convert, the benzene to monochlorobenzene; cupric chloride and hydrogen chloride being the other reactants present in an aqueous reaction mixture.

The process of this invention may be carried out with the aromatic compound in either liquid or gas phase. To carry out the process with the aromatic compound in liquid phase, the reactants are charged to a suitable reactor, such as a conventional stirred reactor or an agitated pressure tube reactor, and thereafter agitated for a period of time at a suitable temperature, after which the product, which is a substituted aromatic compound or compounds, may be separated by conventional means, e.g., fractional distillation, decantation, filtration, etc. The aromatic compound may serve as the reaction medium, in which case it may be maintained in substantial excess of that required to react with the group VIII platinum metal salt. Alternatively, an inert diluent may be added and, if desired, serve as the bulk of the reaction medium. Such inert diluents must be nonreactive with respect to the group VIII platinum metal salt and the aromatic compound and must exert at least some solvent action thereon at the reaction temperature. Suitable diluents include water; acetic acid; aliphatic hydrocarbons, e.g., hexane, heptane, cyclohexane, and isopentane; other aliphatic compounds, e.g., dimethylformamide, butyl chloride, methanol, ethanol, dimethyl sulfoxide, acetonitrile, chloroform, carbon tetrachloride, and carbon disulfide; etc. It is preferred to use as the reaction medium a mixture of an excess of the aromatic compound undergoing reaction and water.

In carrying out the reaction satisfactorily the presence of an acid acceptor is not required and is, in fact, to be avoided. Thus, it is in no way necessary to include acid acceptor materials or buffering agents capable of binding free acid present in the reaction mixture.

The course of the reaction is independent of the reaction pressure, the only requirement being that the pressure on the reaction mixture be such that at least a portion of the aromatic compound is maintained in liquid phase. Generally, the reaction is carried out under the autogenous pressure generated by the components of the reaction mixture. In practice, these pressures will range from about 1 atmosphere up to 100 atmospheres or more.

To carry out the process of this invention with the aromatic compound in gas phase, the aromatic compound is volatilized prior to its contact with the group VIII platinum metal salt and subsequently contacted with the group VIII platinum metal salt in a conventional manner and in conventional apparatus. For example, the group VIII platinum metal salt may be placed in a tubular reactor and the aromatic compound in gaseous form passed or circulated through the reactor. The product, which is a substituted aromatic compound or compounds, may be recovered by conventional means from the exhaust gases. If desired, the group VIII platinum metal salt may be supported on a suitable material, such as carbon, carbonate, silica, alumina, or the like. The supported salt may be obtained commercially or may be prepared by any convenient means, such as by dissolving the salt in a suitable solvent, e.g., water; adding the support, e.g., carbon; and evaporating the solvent with heat under vacuum.

The gas phase reaction generally is carried out at a pressure between about 0.25 to 250 atmospheres and preferably between about 1 and 100 atmospheres.

In one specific embodiment of the present invention, a gaseous stream comprising benzene and, if desired, a carrier gas is passed over palladous chloride, and the chlorobenzenes obtained as the product are recovered from the exhaust gases. A constant level of benzene in the gas stream may be maintained conveniently by saturating a carrier gas with benzene by passing it over or through liquid benzene and thereafter through the reactor. It is possible also, if desired, to vaporize the benzene separately in a flash chamber and to meter it in separately. The exhaust gases are cooled and scrubbed for the recovery of the chlorobenzenes. Thus the product, chlorobenzenes, is obtained in solution with excess benzene, if any, and this mixture may be separated by any convenient means, e.g., by fractional distillation.

The reaction between the group VIII platinum metal salt and the aromatic compound to produce substituted aromatic compounds takes place between about 20° and 600° C. Preferably, however, the reaction when run in liquid phase is carried out at a temperature between about 100° and 300° C. and when run in vapor phase at a temperature between about 300° and 500° C.

The substituted aromatic compounds produced by the process of this invention are of two types: (1) a derivative of the starting aromatic compound containing as an additional substituent on an aromatic ring an anion portion of the group VIII platinum metal salt and (2) a derivative of the starting aromatic compound containing as an additional substituent on an aromatic ring a duplicate of the starting compound less one hydrogen atom, that is, a dimer of the starting aromatic compound less two hydrogen atoms at the point of bonding. The first type of product can be obtained from the reaction of a halide of a group VIII platinum metal, e.g., palladium chloride, and an aromatic compound, e.g., benzene, which produces an aromatic halide, e.g., chlorobenzene. Similarly, palladium chloride can be employed to convert chlorobenzene to o-, m-, and p-dichlorobenzene; nitrobenzene to an isomeric mixture of chloronitrolbenzenes; aniline to chloroanilines; naphthalene to alpha- and beta-chloronaphthalene; anthracene to 9-chloroanthracene; and so on. The same reactions can be carried out using other group VIII platinum metal chlorides such as rhodium trichloride, platinum chloride, iridium chloride, or ruthenium chloride. In a like manner, by selecting group VIII platinum metal salts containing other anions, e.g., palladous cyanide, palladous acetate, palladous methoxide, platinous phenoxide, palladous cyanate, and iridium tribromide, benzene can be converted to benzonitrile, phenyl acetate, anisole, diphenyl ether, phenyl isocyanate, and bromobenzene, respectively.

The second type of product can be obtained as a co-product of the reactions described above. For example, under certain conditions the reaction between palladium chloride and benzene, in addition to producing chlorobenzene, produces at least some biphenyl the dimer of the starting compound. Production of this by-product appears to depend upon reaction temperature. For example, at 150° C. the product mixture from the reaction of palladous chloride with an excess of liquid benzene contains about 85 mole percent of biphenyl and 15 mole percent of monochlorobenzene. At 250° C. and above, however, monochlorobenzene is produced from the same reaction mixture to the substantial exclusion of biphenyl. Similarly, below about 250° C. the reaction between palladous chloride and toluene leads to an isomeric mixture of monochlorotoluenes, i.e., o-, m-, and p-chlorotoluene, and 4,4'-dimethylbiphenyl and isomers thereof. In a like manner it is possible to react palladium chloride or other group VIII platinum metal salts with chlorobenzene to produce an isomeric mixture of dichlorobenzenes and dichlorobiphenyls, including a major proportion of 4,4'-, 3,3'-, and 3,4'-dichlorobiphenyl and a minor proportion of 2,4'-, and 2,3'-, and 2,2'-dichlorobiphenyl. Corresponding isomeric mixtures are produced from aniline, nitrobenzene, benzonitrile, phenyl acetate, etc. From naphthalene the products include, in addition to isomeric chloronaphthalenes, a mixture of 1,1'-, 1,2'-, and 2,2'-binaphthyl.

Generally, the molar ratio of aromatic compound to the group VIII platinum metal salt used as a starting material ranges from about 0.1 to about 1,000 or more and preferably from about 0.3 to 10.

In carrying out the process of the invention it is necessary that the group VIII platinum metal salt which is used be continually regenerated in situ by oxidation with suitable chemical means.

In the course of the reaction of the aromatic compound with the group VIII platinum metal salt, the platinum metal of the group VIII platinum metal salt is reduced to a lower valent state including the free metal. Reoxidation or regeneration of the metal or lower valent salt to the higher valent salt may be conveniently carried out with oxygen, either in pure form or in a mixture such as air, in the presence of the anion being introduced into the aromatic compound. It is preferred, however, to effect the reoxidation or regeneration with a higher valent ion of a multivalent transition metal from the first long period of the periodic system. The transition metals include the elements ranging in atomic number from 22 to 29 inclusive, namely, titanium, vanadium, chromium, manganese, iron, cobalt, nickel, and copper. Cupric and ferric ions are particularly desirable. Preferably, this reaction is carried out in situ, so that the net result is the requirement of only a catalytic amount of the platinum metal in relation to aromatic compound. For example, in preparing chlorobenzene from benzene and palladous chloride in the presence of cupric chloride the following reactions occur simultaneously in situ:

$$C_6H_6 + PdCl_2 \longrightarrow C_6H_5Cl + HCl + Pd$$

$$2CuCl_2 + Pd \longrightarrow 2CuCl + PdCl_2$$

In addition to cupric chloride, other suitable salts include ferric chloride, cupric or ferric acetate, benzoate, cyanide, bromide, sulfate, propionate, laurate, stearate, nitrate, etc., as well as titanium tetrachloride, vanadium pentachloride, potassium permanganate, cobaltic sulfate, potassium nickelate, and the like. The amount of the metal ion may vary from about 2 to about 500 moles per mole of platinum metal with about 5 to 100 moles being preferred. The amount of metal ion should preferably not exceed the stoichiometric amount of aromatic compound present where polysubstitution is considered undesirable. Introduction of the metal salt in a higher valent state with the charge of the platinum metal component enables the platinum metal component to be introduced initially in either the lower valent form, e.g., as the metal, or in a higher valent salt form. In practice, it is preferred to employ about 0.001–0.1 mole of the group VIII platinum metal salt, e.g., palladous chloride, and about 0.005–10 moles of the oxidant, e.g., cupric chloride, per mole of benzene.

As an aid to the reaction of the platinum metal or lower valent noble metal salt with the metal ion, it is desirable to include an inert solvent for the metal salt. For example, suitable solvents for cupric and ferric salts include water; nitriles, e.g., acetonitrile, propionitrile, isobutyronitrile, lauronitrile, stearonitrile, adiponitrile, fumaronitrile, sebaconitrile, etc.; and substituted amides, e.g., N,N-dimethylformamide, N,N-dimethylacetamide, N-methylpyrollidone, and the like. The preferred solvent is water. The solvent is generally used in an amount ranging from about 10 to 99 volume percent, based on the total reaction medium, with about 50 to 99 percent being preferred. It is not necessary that all of the cupric or ferric ions be dissolved in the initial reaction mixture. Accordingly, it is possible to operate in the presence of solid cupric or ferric salts, using a slurry.

Reoxidation of the lower valent ion of the multivalent transition metal in situ may be accomplished in a separate step with free oxygen or a gas containing free oxygen, such as air, in the presence of a source of the anions being introduced onto the aromatic compound. Consequently, the aromatic substitution reaction may be made continuous, utilizing only catalytic quantities of the group VIII platinum metal and of the multivalent transition metal ions by continuously removing a portion of the reaction mixture, separating the substituted aromatic product, reoxidizing the multivalent transition metal ions in the presence of a source of the anion to be introduced onto the aromatic compound, and returning said oxidized multivalent transition metal ions to the reaction mixture.

A convenient source of the anion being introduced is a protonated form of said anion, e.g., hydrogen halides such as hydrogen chloride and hydrogen bromide for chloride and bromide ions, acetic acid for acetate ion, cyanic acid for cyanate ion, etc.

In the case of chlorinating benzene with palladous chloride in the presence of cupric chloride, reoxidation can be carried out in the presence of added HCl according to the reaction:

$$2CuCl + \tfrac{1}{2}O_2 + 2HCl \longrightarrow 2CuCl_2 + H_2O$$

Since the reoxidation of the cuprous or ferrous ions is carried out in a separate stage, it is necessary for continuous operation to have present in the initial reaction mixture a sufficient reserve of cupric or ferric ions to ensure the continuous oxidation of the group VIII platinum metal until reoxidation of the cuprous or ferrous ions is carried out. Accordingly, it is often desirable to operate in the presence of a rather large excess of cupric or ferric salts and, if necessary, in slurry form.

When the above-described recycling steps are combined with the initial substituting reaction, the net result is the consumption of the aromatic compound, oxygen, and the compound supplying the anionic substituent. For example, in the aforementioned chlorination process, the net reaction would be as follows:

$$C_6H_6 + \tfrac{1}{2}O_2 + HCl \longrightarrow C_6H_5Cl + H_2O$$

Accordingly, the net amount of HCl consumed corresponds to the molar quantity of chlorine introduced onto the benzene, less by the amount of chlorine supplied by the cupric chloride initially introduced. The amount of HCl added may range from about 0.005 to about 10 moles per mole of benzene. In practice, it is preferred to add about 0.1 to 1.0 mole of HCl per mole of benzene. The HCl may be added initially or in the recycle step or both.

If desired, the product chlorobenzene may be passed over appropriate hydrolysis catalysts by methods known to the art and converted to phenol and hydrogen chloride. The hydrogen chloride may then be used in a subsequent chlorobenzene synthesis, thus providing an overall process for phenol from benzene and oxygen:

$$C_6H_6 + \tfrac{1}{2}O_2 \longrightarrow C_6H_5OH$$

With respect to the production of monochlorobenzene, the present process exhibits several distinct advantages over the processes of the art. It gives a high conversion of benzene to monochlorobenzene with only a small amount of dichlorobenzene being formed, and, moreover, hydrogen chloride can be used as the source of chlorine. For example, conversions of over 70 weight percent of benzene to chlorinated benzenes, of which about 90 weight percent is monochlorobenzene, can be realized by this process. Another advantage of this process is the ability of the reaction medium to tolerate water. This feature eliminates the need of anhydrous reactants and simplifies the separation of the water-insoluble products from water-soluble catalyst components.

The amount of benzene, the amount of hydrogen chloride, and the amount of oxygen may each vary from about 2.5 to 95 volume percent. The stoichiometric mixture would contain in the gas stream about 40 percent of benzene, about 40 percent of hydrogen chloride, and about 20 percent of oxygen. Preferably the benzene content may range from about 10 to 50 percent, the hydrogen chloride from about 30 to 80 percent, and the oxygen from about 5 to 25 percent.

In accordance with still another preferred feature of this invention, substituted aromatic compounds are prepared by a vapor phase reaction in which an aromatic compound in the vapor state is reacted with a catalytic amount of a group VIII platinum metal salt and the salt is continuously regenerated in situ by oxidation with oxygen in the presence of a protonated form of the anion of the group VIII platinum metal salt.

The protonated form of the anion of the group VIII platinum metal salt includes hydrogen halides, e.g., hydrogen fluoride, hydrogen chloride, hydrogen bromide, and hydrogen iodide; hydrogen cyanide; acetic acid; propionic acid; benzoic acid; ethanol; methanol; and so forth.

The oxygen required for this process may be used either in pure form or as an oxygen-containing gas, such as air. Because of the economics involved, air is the preferred source of oxygen.

In a specific embodiment of this feature of the invention, a gaseous stream comprising benzene, hydrogen chloride, and oxygen is passed over a catalytic amount of a group VIII platinum metal catalyst, and a mixture of chlorobenzenes is recovered from the exhaust gases.

Both the liquid and the gas phase embodiments of the present process exhibit distinct advantages over the art. For example, by means of the present process it is possible to obtain monochlorobenzene with little or no simultaneous production of polychlorobenzenes. In the liquid phase embodiment, the reaction medium can tolerate water, thereby eliminating the need of anhydrous reactants and simplifying the separation of water-insoluble products from water-soluble catalyst components. The gas phase embodiment enables the process to utilize in the synthesis of chlorobenzene and other aromatic products the advantages normally attendant with vapor phase techniques, e.g., simple equipment, ready handling at elevated temperatures, convenient recycle, etc. With respect to chlorobenzene, the continuous vapor phase process can give unexpectedly high conversions of benzene to monochlorobenzene, e.g., over 24 percent, with the ratio of monochlorobenzene to dichlorobenzene exceeding 9:1.

The products obtainable by the present process, such as chlorobenzene, chlorotoluene, chloronitrobenzene, dichlorobenzene, benzonitrile, phenyl acetate, biphenyl, polyphenyls, and the like, find widespread commercial use as chemical intermediates in the synthesis of polymers, copolymers, dyes, insecticides, etc.

EXAMPLE I 0.0029 gram (0.016 millimole) of palladous chloride, 0.018 gram (0.50 millimole) of ferric chloride, 0.3 ml. of benzene, and 0.3 ml. of water were heated at 250° C. for 18 hours in a rocking, sealed glass tube. Analysis of the product mixture by vapor phase chromatography indicated the presence of 0.24 millimole (1,500 percent based on palladous chloride) of monochlorobenzene. Under the same conditions, using 0.082 gram (0.46 millimole) of palladous chloride and omitting the ferric chloride, 0.22 millimole (47 percent based on palladous chloride) of monochlorobenzene was obtained. When the same experiment was carried out omitting the palladous chloride, only 0.014 millimole (2.5 percent based on ferric chloride) of monochlorobenzene was produced.

EXAMPLE II

By procedure of example I 0.0022 gram (0.012 millimole) of palladous chloride, 0.14 gram (0.84 millimole) of cupric chloride dihydrate, 0.3 ml. of benzene, and 0.3 ml. of water were heated at 250° C. for 18 hours. Analysis by vapor phase chromatography indicated the presence of 0.38 millimole (3,170 percent based on palladous chloride) of monochlorobenzene.

When the same experiment was repeated except that palladous chloride was omitted, no chlorobenzenes were found in the reaction product mixture.

A third run was made, omitting palladous chloride, but including in the reaction mixture 0.17 gram (0.97 millimole) of cupric chloride dihydrate, 0.16 gram (0.99 millimole) of ferric chloride, 0.33 gram (4.25 millimoles) of benzene, and 0.6 ml. of water. Analysis of the reaction mixture by vapor phase chromatography after heating at 250° C. for 2 hours indicated the presence of 0.036 millimole (3.7 percent based on metal chlorides) of monochlorobenzene.

These runs show that a platinum metal salt is required for the production of substituted aromatic products in other than minor amounts.

EXAMPLE III

A glass-lined rocking autoclave was charged with 39 grams (0.5 mole) of benzene, 128 grams (0.75 mole) of cupric chloride dihydrate, 5.8 grams (0.05 mole) of palladous chloride, and 100 ml. of water. The system was pressured to 1,000 psig with nitrogen heated to 250° C. without agitation, then agitated at that temperature for 150 minutes. The bomb was cooled and the contents filtered free of cuprous chloride. Distillation of the organic phase yielded 9.7 grams (172 percent based on palladous chloride) of monochlorobenzene, b.p. 130°–134° C., n 20/D = 1.5256.

EXAMPLE IV

By the procedure of example I 0.19 gram (1.1 millimoles) of cupric chloride dihydrate, 0.0078 gram (0.074 milligram-atom) of palladium black, 0.3 ml. of benzene, and 0.3 ml. of water were heated at 250° C. for 18 hours. Analysis by vapor phase chromatography indicated the presence of 0.53 millimole (716 percent based on palladous chloride) of monochlorobenzene.

EXAMPLE V

By the procedure of example I 4.7 millimoles of cupric chloride dihydrate, 0.057 milligram-atom of palladium black, 1.6 millimoles of benzene, and 0.6 ml. of water were heated at 250° C. for 12 hours. Analysis by vapor phase chromatography indicated the presence of 0.92 millimole (63.2 weight percent based on benzene charged) of monochlorobenzene, 0.087 millimole (7.8 weight percent based on benzene charged) of combined chlorobenzenes, and 0.47 millimole (20 weight percent based on benzene charged) of benzene.

EXAMPLE VI

By the procedure of example I 0.073 gram (0.43 millimole) of cupric chloride dihydrate, 0.0088 gram (0.083 milligram-atom) of palladium black, 0.3 ml. of benzene, 0.9 ml. of water, and 0.1 ml. of 36 percent aqueous hydrochloric acid were heated at 250° C. for 2 hours. The organic layer was separated from the aqueous layer, and the organic layer was found by vapor phase chromatography to contain 0.145 millimole of monochlorobenzene. A current of oxygen was bubbled through the aqueous layer for several minutes, after which time the material was transferred to another tube, treated with 0.3 ml. of benzene, and heated again at 250° C. for 2 hours. The above procedure was repeated a number of times. After eight such chlorinations, a total of 0.552 millimole of monochlorobenzene had been prepared. This was equivalent to a 256 percent yield based on the cupric chloride and 665 percent based on palladous chloride.

EXAMPLE VII

By the procedure of example I 0.62 gram (2.8 millimoles) of cupric bromide, 0.019 gram (0.18 milligram-atom) of palladium black, 0.3 ml. of benzene, and 0.6 ml. of water were heated at 250° C. for 2 hours. Analysis by vapor phase chromatography indicated the presence of 0.68 millimole (378 percent based on palladous bromide) of bromobenzene.

EXAMPLE VIII

In a magnetically stirred, 500-ml. round-bottom flask equipped with a nitrogen-blanketed reflux condenser, 50.0 grams (0.52 mole) of phenol, 51.2 grams (0.3 mole) of cupric chloride dihydrate, 2.0 grams (0.01 mole) of palladous chloride, and 100 ml. of water were heated under reflux (100° C.) for 15 days. Vapor phase chromatography indicated the presence of 0.023 mole (230 percent based on palladous chloride) of mixed chlorophenols.

EXAMPLE IX

By the procedure of example I 0.36 gram of chlorobenzene, 0.065 gram of cupric chloride dihydrate, and 0.010 gram of metallic palladium were heated at 250° C. for 2 hours. Analysis by vapor phase chromatography indicated that o-, m-, and p-dichlorobenzene had been formed in a molar ratio of 17:45:38.

EXAMPLE X

A length of 11 mm. inner diameter glass tubing was charged with 10 grams of 0.5 percent palladium on alumina pellets. It was heated at 400° C. in a tube furnace. A stream of 12 liters per hour (490 millimoles per hour) of anhydrous hydrogen chloride and 1.2 liters per hour (49 millimoles per hour) of oxygen was bubbled through benzene at room temperature and passed into the heated tube. The exhaust gases were passed through a trap, and the condensate analyzed by vapor phase chromatography. In four hours of operation 22 grams (282 millimoles) of benzene was entrained and 17.7 millimoles of monochlorobenzene was produced. The conversion was 6.3 percent, based on benzene.

EXAMPLE XI

The procedure of example X was repeated except that the catalyst was 10 grams of 0.5 percent palladium on 4–8 mesh carbon and the temperature was 575° C. In 3 hours of operation 26 grams (333 millimoles) of benzene was entrained and 18.7 millimoles of monochlorobenzene was produced. The conversion was 5.6 percent, based on benzene.

EXAMPLE XII

The procedure of example X was repeated except that 10 grams of 0.5 percent palladium on extruded carbonate carrier (Engelhard Industries, Inc.) was used as a catalyst and the temperature was 400° C. In 3 hours of operation 237 millimoles of benzene was entrained and 58 millimoles (24.4 percent) monochlorobenzene and 5.5 millimoles (2.3 percent) of mixed dichlorobenzenes were produced. The ratio of mono- to dichlorobenzene was 10.7:1.

EXAMPLE XIII

The procedure of example X was repeated except that the catalyst was 10 grams of 1 percent palladium on alumina pellets and the temperature was 250° C. In 3 hours of operation 181 millimoles of benzene was entrained and 2.04 millimoles of monochlorobenzene was produced.

EXAMPLE XIV

The procedure of example X was repeated except that the catalyst was 0.18 gram of palladous chloride on 10 grams of silica gel, made by dissolving the palladous chloride in dilute hydrochloric acid, adding the silica gel, and slowly evaporating the solvent by heat and suction. In 3 hours of operation 265 millimoles of benzene was entrained and 31.4 millimoles of monochlorobenzene was produced. The conversion as thus 12.6 percent, based on benzene. Also produced was 2.4 millimoles of mixed dichlorobenzenes. The molar ration of mono- to dichlorobenzene was 13.5:1.

EXAMPLE XV

The procedure of example X was repeated except that the catalyst was 0.18 gram of palladous chloride deposited on 10 grams of 20-mesh silicon by dissolving the palladous chloride in dilute hydrochloric acid, adding the silicon, and evaporating the solvent by heat and suction. The reaction temperature was 250° C. In 3 hours 168 millimoles of benzene was entrained and 2.6 millimoles (1.6 percent) of monochlorobenzene was produced.

EXAMPLE XVI

The procedure of example X was repeated except that the catalyst was 0.18 gram of palladous chloride deposited on 10 grams of chrome-alumina by the procedure of example XXVIII. In 3 hours 198 millimoles of benzene was entrained and 62 millimoles (31 percent) of monochlorobenzene and 10.2 millimoles of mixed dichlorobenzenes were produced.

EXAMPLE XVII

The procedure of example XVI was repeated except that the oxygen flow was 0.6 liter per hour (25 millimoles per hour). In 3 hours 230 millimoles of benzene was entrained and 47 millimoles (20 percent) of monochlorobenzene was produced.

EXAMPLE XVIII

The procedure of example XVI was repeated except that 3.0 liters per hours of air was substituted for the oxygen. In 1 hour 46 millimoles of benzene was entrained and 5.3 millimoles (11.5 percent) of monochlorobenzene was produced.

EXAMPLE XIX

The procedure of example X was repeated except that the catalyst was 10 grams of 0.5 percent rhodium on ⅛-in. alumina balls. In 3 hours 238 millimoles of benzene was entrained and 16.6 millimoles (7.0 percent) of monochlorobenzene was produced.

EXAMPLE XX 10 grams of 0.5 percent palladium on carbon was charged into a glass tube which was heated to 400° C. A gaseous flow comprising 1,000 millimoles of hydrogen cyanide, 440 millimoles of nitrogen, 25 millimoles of oxygen, and 70 millimoles of benzene per hour was passed through the tube. The effluent mixture was collected in a trap and analyzed by vapor phase chromatography, revealing the formation of benzonitrile at a rate of 0.1 millimole per hour.

While there are above disclosed but a limited number of embodiments of the process of the invention herein presented, it is possible to produce still other embodiments without departing from the inventive concept herein disclosed. It is desired, therefore, that only such limitations be imposed on the appended claims as are stated therein.

What is claimed is:

1. A process for introducing a chloride or bromide substituent onto an aromatic ring of an aromatic compound which consists of
   1. reacting an aromatic compound selected from the group consisting of benzene, nitrobenzene, toluene, phenol, chlorobenzene and biphenyl, said aromatic compound being the sole organic reactant, in the absence of an acid acceptor or buffering agent, at a temperature of about 20° C. to about 600° C. and at a pressure between about 0.25 and 250 atmospheres with a catalytic amount of a group VIII platinum metal chloride or bromide, whereby the substituent introduced onto the aromatic compound is derived from the anion portion of said group VIII platinum metal chloride or bromide,
   2. continuously regenerating in situ said group VIII platinum metal chloride or bromide with a multivalent transition metal chloride or bromide wherein the metal, which is in its highest valence state, is selected from the group consisting of titanium, vanadium, chromium, manganese, iron, cobalt, nickel and copper and the halide corresponds to the group VIII platinum metal halide, and
   3. recovering the chlorinated or brominated aromatic compound.

2. The process of claim 1 wherein the reaction is carried out in the liquid phase.

3. The process of claim 2 wherein the temperature is in the range of 100° to 300° C.

4. The process of claim 1 wherein the reaction is carried out in the vapor phase.

5. The process of claim 4 wherein the temperature is in the range of 300° to 500° C.

6. The process of claim 1 wherein the group VIII platinum metal chloride or bromide is palladium bromide.

7. The process of claim 1 wherein the group VIII platinum metal chloride or bromide is palladium chloride.

8. The process of claim 1 wherein the multivalent transition metal halide is cupric chloride or cupric bromide.

9. The process of claim 1 wherein the multivalent transition metal halide is ferric chloride or ferric bromide.

10. The process of claim 1 which further includes:
    a. continuously withdrawing portions of the reaction mixture containing chlorinated or brominated aromatic product and reduced multivalent transition metal ions,
    b. removing the chlorinated or brominated aromatic product from said withdrawn portion,
    c. reoxidizing the reduced multivalent transition metal ions remaining in said withdrawn portion in the presence of a free oxygen-containing gas, and the hydrogen chloride or bromide corresponding to the group VIII platinum metal chloride or bromide, to form the reoxidized transition metal chloride or bromide, and
    d. returning said transition metal chloride or bromide to the reaction mixture.

* * * * *